(12) United States Patent
Moilanen

(10) Patent No.: US 8,104,582 B2
(45) Date of Patent: Jan. 31, 2012

(54) ARRANGEMENT IN CONNECTION WITH CENTRAL LUBRICATION SYSTEM

(75) Inventor: Teuvo Moilanen, Säynätsalo (FI)

(73) Assignee: Osakeyhtio SKF Aktiebolag, Espoo (FI)

( * ) Notice: Subject to any disclaimer, the term of this patent is extended or adjusted under 35 U.S.C. 154(b) by 1185 days.

(21) Appl. No.: 10/563,135

(22) PCT Filed: Jun. 28, 2004

(86) PCT No.: PCT/FI2004/000393
§ 371 (c)(1),
(2), (4) Date: Apr. 21, 2006

(87) PCT Pub. No.: WO2005/003620
PCT Pub. Date: Jan. 13, 2005

(65) Prior Publication Data
US 2006/0243529 A1    Nov. 2, 2006

(30) Foreign Application Priority Data
Jul. 3, 2003  (FI) ..................... 20031008

(51) Int. Cl.
*F16N 13/16*  (2006.01)
*F01N 9/00*  (2006.01)
(52) U.S. Cl. .......................... 184/29; 184/6.1
(58) Field of Classification Search .......... 184/6.12, 184/6.1, 29, 26; 324/207.2, 207.26; 709/217, 709/224; 123/196 R
See application file for complete search history.

(56) References Cited

U.S. PATENT DOCUMENTS

| 3,872,473 A * | 3/1975 | Melgaard et al. ............ 340/520 |
| 3,894,250 A * | 7/1975 | Hager et al. .................. 327/511 |
| 5,926,018 A * | 7/1999 | Jones ........................ 324/207.26 |
| 6,928,976 B2 * | 8/2005 | Håkansson ............... 123/196 R |
| 2002/0165953 A1 * | 11/2002 | Diong ........................... 709/224 |

FOREIGN PATENT DOCUMENTS

| DE | 43 11 338 | 10/1994 |
| JP | U-60-51409 | 4/1985 |
| JP | A-7-190704 | 7/1995 |
| JP | U-7-41172 | 7/1995 |
| JP | A-9-239638 | 9/1997 |
| JP | A-2001-174207 | 6/2001 |
| JP | 2001264006 | 9/2001 |
| JP | A-2003-527591 | 9/2003 |

OTHER PUBLICATIONS

Honeywell Incorporated, Hall Effect Sensing and Application, Nov. 1998.*
Official Action mailed Jun. 22, 2010 in Japanese Patent Application No. 2006-518247.

* cited by examiner

*Primary Examiner* — Michael Mansen
*Assistant Examiner* — Robert Reese
(74) *Attorney, Agent, or Firm* — Barnes & Thornburg LLP

(57) ABSTRACT

The invention relates to an arrangement in connection with a central lubrication system. The arrangement includes a lubricant vessel, a pump unit, a control unit, pipe systems, a pressure monitor unit, at least one lubricant feeder provided with at least one piston which moves due to the influence of the pressure of a lubricant present in the pipe system/object to be lubricated, and a movement monitor unit to monitor the operation of the feeder. The movement monitor unit includes a sensor part mounted to a nipple manufactured from a weakly magnetable material. The nipple includes a permanent magnet to generate a magnetic field, and a sensor for detecting movement of the piston, and an electronics part which processes a signal received from the sensor and forwards this processed signal to the control unit.

9 Claims, 2 Drawing Sheets

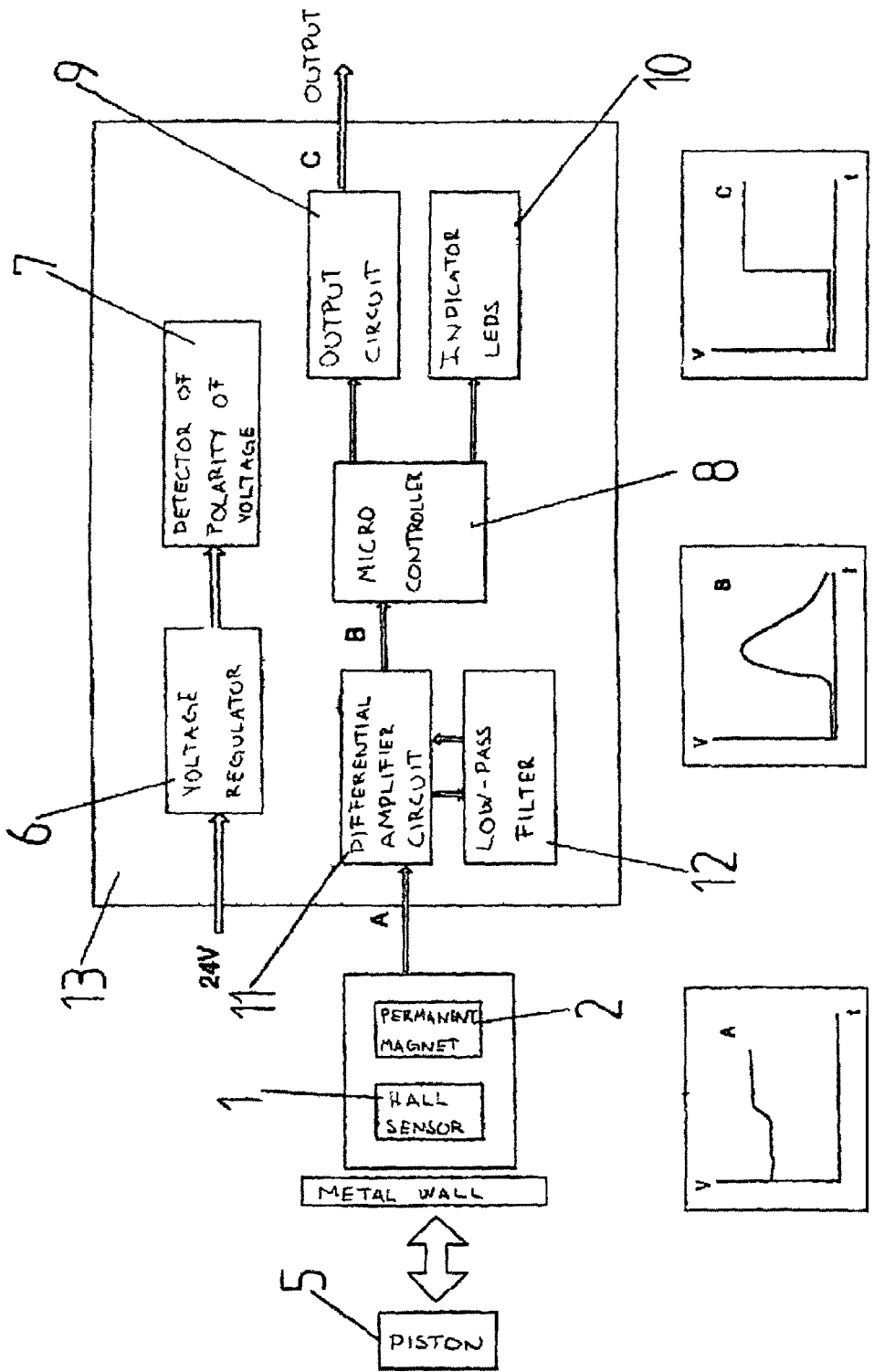

ARRANGEMENT IN CONNECTION WITH CENTRAL LUBRICATION SYSTEM

This is the U.S. National Stage of International Application No. PCT/FI2004/000393, filed on Jun. 28, 2004, which relies for priority upon Finnish Application No. 20031008, filed Jul. 3, 2003, the contents of both of which are incorporated herein by reference in their entireties.

BACKGROUND OF THE INVENTION

The invention relates to an arrangement in connection with a central lubrication system according to the preamble of claim 1, the arrangement comprising a lubricant vessel, a pump unit, a control unit, pipe systems, a pressure monitor unit, at least one feeder provided with at least one piston which moves due to the influence of the pressure of a lubricant present in the pipe system/object to be lubricated, and a movement monitor unit for each feeder in order to monitor the operation of the system, the lubricant being arranged to be pumped from the lubricant vessel along the pipe systems to the feeders and further to the objects to be lubricated, and a junction part located in the movement monitor unit outside a pressurized space.

Typically, conventional central lubrication systems known in the art include a lubricant vessel, a pump unit, an electric control unit, pipe systems, lubricant feeders and movement monitor units. The movement monitor units are conventionally used for monitoring movement of the piston of a feeder, and for controlling the operation of the system. In order to detect movement of the piston, the movement monitor unit comprises a switch. In the prior art, the switch is a magnetic switch to switch and release at a predetermined strength of a magnetic field, the field strengths of a switching point and a releasing point being different in magnitude, i.e. the switch involves hysteresis. Bodies of feeders are manufactured both from a magnetable (galvanized) and non-magnetable (acid-proof) material so that the body affects a change in the magnetic field caused by the piston, and thus the aforementioned operating points. In order to work well, such a solution would require a permanent magnet to be mounted to the piston so as to obtain a sufficient change in the magnetic field. However, the switch hysteresis restricts the use of a sensor in such a solution at a small dose, when the movement of the piston is small.

A problem with the above-described arrangement is that the piston moves in a space wherein large pressure variations (typically 0 to 250 bar) occur and, in addition, the diameter of the piston is small (typically 4 to 8 mm), so that it should be possible to detect even small movements of the piston. This conventional structure is not, however, capable of detecting movement of the piston with a sufficient accuracy at small movement lengths of the piston.

BRIEF DESCRIPTION OF THE INVENTION

An object of the invention is thus to provide a method according to the characterizing part of claim 1 so as to enable the aforementioned problems to be solved. The object of the invention is achieved by an arrangement which is characterized in that the junction part is manufactured from a weakly magnetable material and it comprises a sensor part which, in turn, comprises a permanent magnet in order to generate a magnetic field, and a sensor for detecting movement of the magnetable piston, and an electronics part which processes a signal received from the sensor and produced as a result of a change in the magnetic field caused by the movement of the piston with respect to the sensor part, and forwards this processed signal to the control unit.

Preferred embodiments of the invention are disclosed in the dependent claims.

The invention is based on detecting movement of a piston of a feeder by mounting, to a weakly magnetable nipple of a movement monitor unit, a permanent magnet and a sensor to detect movement of the piston of the feeder by means of a change in a magnetic field generated by the permanent magnet. As a result of the change in the magnetic field, the sensor transmits a signal to an electronics part of the movement monitor unit, which processes the signal and forwards it to a control unit.

An advantage of the method and system of the invention is that the sensor may be mounted outside a pressurized space such that it still is, however, capable of detecting even small movement lengths of the piston.

In a preferred embodiment of the invention, the sensor is a Hall sensor.

In another preferred embodiment of the invention, the output of the movement monitor unit is locking so that the detection mode of the piston remains in a memory.

The locked detection mode of the movement monitor unit can be released by cutting the operating voltage of the sensor for a predetermined time.

Furthermore, in an embodiment of the arrangement of the invention, the movement monitor unit resides in its entirety outside the pressurized space of the feeder.

Furthermore, in another embodiment, the electronics part comprises a voltage regulator, a detector for detecting polarity of voltage, a microcontroller, an output circuit, indicator LEDs as well as an amplifier part comprising a differential amplifier circuit and low-pass filters.

In a preferred embodiment, the output circuit is a potential-free relay contact and the plurality of movement monitor units of the central lubrication system are coupled in series.

BRIEF DESCRIPTION OF THE DRAWINGS

The invention is now described in closer detail in connection with the preferred embodiments and with reference to the accompanying drawings, in which

FIGS. 2-3C provide functional diagrams of the arrangement according to the present invention.

DETAILED DESCRIPTION OF THE INVENTION

Figure 1A:
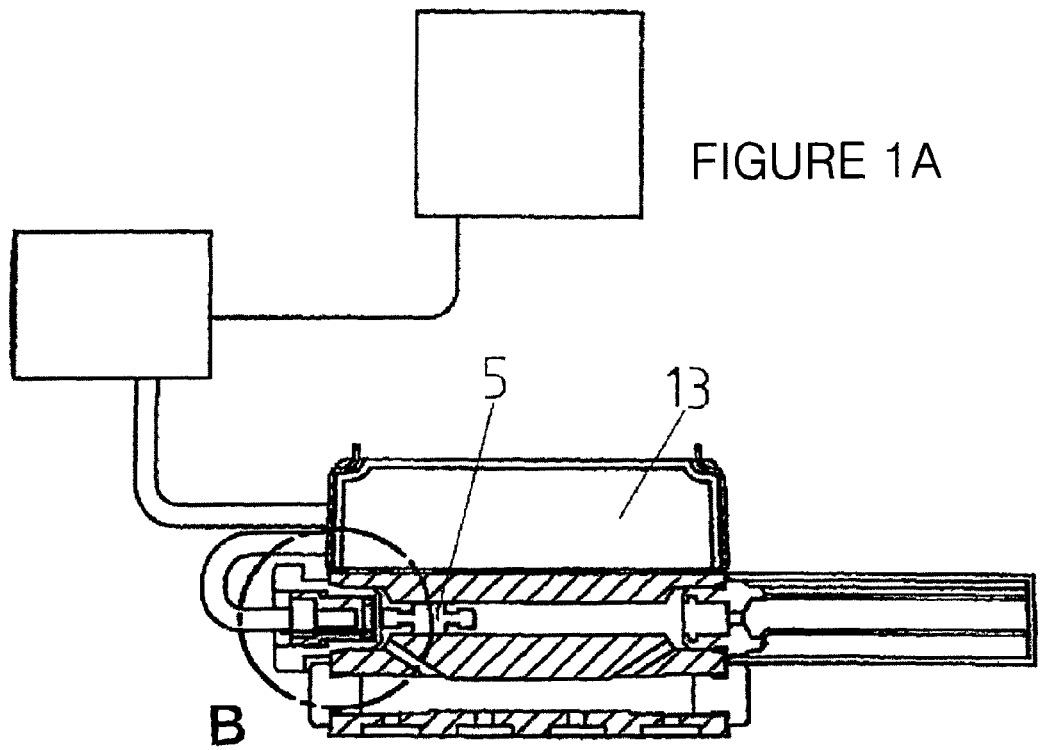
FIGS. 1A-1B show an arrangement according to the present invention for detecting movement of a piston by a movement monitor unit.
Figure 1B:
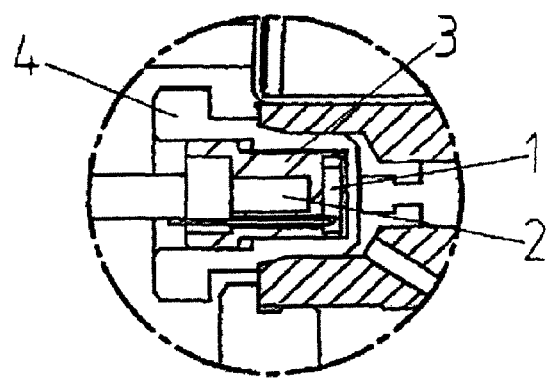

A central lubrication system according to the present invention comprises a lubricant vessel, a pump unit, a control unit, pipe systems and a feeder provided with at least one piston 5. FIGS. 1A-1B show a preferred embodiment of the present invention which shows a movement monitor unit connected to the feeder, the movement monitor unit comprising a junction part 4 and an electronics part 13. The junction part, i.e. a nipple 4, further comprises a sensor part 3 which, in turn, comprises a permanent magnet 2 and a sensor 1 which in the present embodiment is a Hall sensor, preferably an analogue Hall sensor, but it may also be a sensor of another type which is suitable for the present invention. The movement monitor unit is arranged in connection with the feeder as indicated in FIGS. 1A-1B while the nipple 4 is arranged in its operation area in the vicinity of a travel groove of the feeder piston 5 of the lubricant feeder, outside the pressurized space of the feeder, however. A wall, usually made of metal, is thus provided between the piston 5 and the sensor part 3. The piston 5 is manufactured from a magnetizable material whereas the nipple 4 is manufactured from a weakly magnetizable or a non-magnetizable material. In FIGS. 1A-1B, the sensor 1 is mounted to the nip 4 as close to the piston 5 as possible, and the permanent magnet 2 is mounted at a suitable distance on the back. The central lubrication system often includes a plurality of the above-described feeders, each being provided with a movement monitor unit of its own. In addition of the aforementioned parts, the system may comprise a pressure monitor unit for monitoring pressure in the system; the pressure monitor unit may be a pressure switch or a pressure transmitter.

The nipple 4 and thus also the sensor part 3 are mounted such that movement of the piston 5, which is made of a magnetizable material and which moves due to the influence of the pressure of a lubricant present in the pipe system and the object to be lubricated, causes a change in the magnetic field generated by the permanent magnet upon approaching the sensor part 3. The sensor 1 is responsible for detecting this change in the magnetic field and for transferring the signal obtained about the change to the electronics part 13 of the pressure monitor unit. The signal shown in FIG. 2A is transmitted to the electronics part by the sensor 1 is shown in FIG. 2. Preferably, in the solution according to FIG. 2, the piston makes a back-and-forth movement, requiring a sufficient pressure difference in order to move. The body of the feeder may be made of a magnetizable or a non-magnetizable material.

In accordance with FIG. 2, the electronics part 13 comprises a voltage regulator 6, a detector 7 for detecting polarity of voltage, a minicontroller 8, an output circuit 9, indicator LEDs 10 as well as an amplifier part comprising a differential amplifier circuit 11 and a low-pass filter 12. From the sensor 1, the signal travels to the differential amplifier circuit 11 of the electronics part 13 and therefrom further to the low-pass filter 12 whose output is an average of the signal obtained from the sensor. The output obtained from the differential amplifier 11 is thus an amplified difference of the signal and its average, shown in FIG. 3B.

Next, the signal travels to the microcontroller 8, which converts the signal received from the amplifier 11 into a digital form. A final decision about an output signal of the electronics part is made on the basis of a signal level and duration. The output circuit 9 is a potential-free relay contact which gives the signal outputted from the electronics part 13 an output in accordance with a selected operation mode. This pulse-shaped output signal is shown in FIG. 3C. According to the present invention, the operation mode may be a pulse-shaped one or a locking one.

The voltage regulator 6 shown in FIG. 2 converts a supply voltage (24 V) to suit electronics. By means of the detector 7 for detecting polarity of voltage, the movement monitor unit is made to operate in two different operation modes, depending on the polarity of the supply voltage. A task of the indicator LEDs included in the electronics part is to indicate the mode of the relay 9 of the output circuit. Other indicator devices may also be used for the purpose. The entire electronics part 13 may also be composed differently, as long as it is capable of processing a pulse given by a sensor and making it into a pulse in accordance with a selected operation mode.

Conventionally, a central lubrication system includes a plurality of feeders to be monitored by monitoring sensors. Hence, a problem is the large number of sensor wires from the feeders to a center monitoring the operation. Furthermore, each sensor requires an I/O input of its own at the monitoring center. Conventionally, the final output is pulse-shaped in all sensor solutions so that the output changes its mode when an object to be detected enters a detection distance, and further changes it back to the other mode when the object leaves a detection area. The operation moment and the direction of operation of all feeders in the system are not necessarily the same, so the sensors of different feeders cannot be coupled in parallel or in series in order to reduce wiring.

In the present application, however, the output of the movement monitor unit is locking in a second operation mode, in other words the detection mode of the piston 5 remains in a memory until the memory is released. This principle together with a potential-free output enables the outputs of the movement monitor unit to be coupled in series. Series coupling reduces wiring and the number of necessary I/O inputs at a monitoring center. The center now reads the mode of a loop coupled in series when a lubrication cycle ends, releases the memory and gives an alarm, depending on the mode of the loop. The sensor is also automatically activated for a correct operation point, irrespectively of the feeder size and material. In addition, slow changes in the output caused by temperature and other factors do not affect the operation of the movement monitor unit.

The preferred embodiment described above may be modified within the scope of the claims. The movement monitor unit may be mounted in connection with a feeder in many different ways, and the sensor part 3 may also be placed in a varying manner with respect to the moving piston 5 of the feeder, preferably, however, outside the pressurized space of the feeder; this enables a conventional piston 5 to be used.

It is obvious to one skilled in the art that as technology advances, the basic idea of the invention may be implemented in many different ways. The invention and its embodiments are thus not restricted to the above-described examples but may vary within the scope of the claims.

The invention claimed is:

1. An arrangement in connection with a central lubrication system, the arrangement comprising
   a lubricant vessel,
   a pump unit,
   a control unit,
   pipe systems,
   a pressure monitor unit,
   at least one feeder provided with at least one magnetizable piston that moves due to the influence of the pressure of a lubricant present in the pipe system to be lubricated, and
   a movement monitor unit for each feeder configured to monitor the operation of the central lubrication system, the lubricant being arranged to be pumped from the lubricant vessel along the pipe to the feeders and objects to be lubricated, wherein the movement monitor unit is entirely located outside a pressurized space of the corresponding at least one feeder, the pressurized space being formed by at least one wall, wherein the movement monitor unit comprises both a junction, which is manufactured from a weakly magnetizable material and includes both a fixed permanent magnet that is stationary with respect to the sensor and configured to generate a magnetic field, and a sensor configured to detect movement of the magnetizable piston, and the movement monitor unit further comprises an electronics part which processes a signal received from the sensor produced as a result of a change in the magnetic field caused by the movement of the piston and forwards this processed signal to the control unit.

2. An arrangement as claimed in claim 1, wherein the sensor is a Hall sensor.

3. An arrangement as claimed in claim 2, wherein the sensor is an analogue Hall sensor.

4. An arrangement as claimed in claim 2, wherein output of the movement monitor unit is locking so that a detection mode of the piston remains in a memory.

5. An arrangement as claimed in claim 4, wherein the locked detection mode of the output of the movement monitor unit is releasable by cutting an operating voltage of the sensor for a predetermined time.

6. An arrangement as claimed in claim 1, wherein the movement monitor unit is in its entirety located outside a pressurized space of the feeder.

7. An arrangement as claimed in claim 1, wherein the electronics part comprises a voltage regulator, a detector for detecting polarity of voltage, a microcontroller, an output circuit, indicator LEDs as well as an amplifier part comprising a differential amplifier circuit and low-pass filters.

8. An arrangement as claimed in claim 7, wherein the output circuit is a potential-free relay contact.

9. An arrangement as claimed in claim 1, wherein the plurality of movement monitor units of the central lubrication system are coupled in series.

* * * * *